US010736284B2

(12) United States Patent
Baker (10) Patent No.: US 10,736,284 B2
(45) Date of Patent: Aug. 11, 2020

(54) VERTICAL HYDROPONIC SYSTEM (71) Applicant: Keith Baker, San Francsico, CA (US)

(72) Inventor: Keith Baker, San Francsico, CA (US)

(*) Notice: Subject to any disclaimer, the term of this patent is extended or adjusted under 35 U.S.C. 154(b) by 601 days.

(21) Appl. No.: 15/254,779

(22) Filed: Sep. 1, 2016

(65) Prior Publication Data
US 2017/0055473 A1    Mar. 2, 2017

Related U.S. Application Data (60) Provisional application No. 62/212,984, filed on Sep. 1, 2015.

(51) Int. Cl.
*A01G 31/06* (2006.01)
*A01G 9/02* (2018.01)

(52) U.S. Cl.
CPC ............. *A01G 31/06* (2013.01); *A01G 9/023* (2013.01); *Y02P 60/216* (2015.11)

(58) Field of Classification Search
CPC ........ A01G 31/06; A01G 9/023; Y02P 60/216
See application file for complete search history.

(56) References Cited

U.S. PATENT DOCUMENTS

| | | | | |
|---|---|---|---|---|
| 4,216,617 A | * | 8/1980 | Schmidt ................. | A01G 31/06 47/62 A |
| 4,454,684 A | * | 6/1984 | O'Hare ................... | A01G 9/022 47/82 |
| 5,265,376 A | | 11/1993 | Less | |
| 5,555,676 A | * | 9/1996 | Lund ...................... | A01G 9/022 47/82 |
| 6,240,674 B1 | * | 6/2001 | Otake .................... | A01C 1/042 47/56 |
| 6,615,542 B2 | | 9/2003 | Ware | |
| 6,698,136 B1 | * | 3/2004 | Cleveland ............. | A01G 9/0295 47/39 |
| 7,516,574 B2 | | 4/2009 | Gottlieb et al. | |
| 8,505,238 B2 | | 8/2013 | Luebbers et al. | |
| 9,622,427 B2 | * | 4/2017 | Wagner ................. | A01G 9/022 |
| 2002/0040548 A1 | * | 4/2002 | Ware ..................... | A01G 31/02 47/83 |
| 2002/0088175 A1 | * | 7/2002 | Locke ................... | A01G 3/00 47/79 |
| 2002/0144461 A1 | * | 10/2002 | Marchildon ......... | A01G 31/047 47/65.5 |
| 2002/0162275 A1 | * | 11/2002 | Robinson ............. | A01G 31/02 47/62 N |
| 2003/0089037 A1 | * | 5/2003 | Ware ..................... | A01G 31/02 47/83 |

(Continued)

*Primary Examiner* — Kevin R Kruer
(74) *Attorney, Agent, or Firm* — Christopher Pilling (57) ABSTRACT

A vertical hydroponic system comprising a hollow cylindrical growing housing including a first end, a second end, and a peripheral surface having a plurality of apertures, the plurality of apertures having an external opening and an internal opening, the external opening located at a distance offset from the internal opening creating an angled surface extending between the external and internal opening, a spray nozzle located at the first end, a drain apparatus located at the second end, a container containing a liquid, a pump submerged in the liquid, a supply line extending from the pump to the spray nozzle, and a drain line extending from the drain apparatus to the container.

4 Claims, 13 Drawing Sheets

(56) References Cited

U.S. PATENT DOCUMENTS

| | | | |
|---|---|---|---|
| 2006/0032128 A1* | 2/2006 | Bryan, III | A01G 31/06 47/62 R |
| 2006/0150476 A1* | 7/2006 | McCrory | A01G 7/06 47/32 |
| 2006/0156624 A1* | 7/2006 | Roy | A01G 31/02 47/62 R |
| 2007/0033866 A1* | 2/2007 | Henry | A01G 9/022 47/40.5 |
| 2012/0005958 A1* | 1/2012 | Laitsch | A01G 31/02 47/62 R |
| 2012/0297678 A1* | 11/2012 | Luebbers | A01G 31/02 47/62 A |
| 2013/0118074 A1* | 5/2013 | Fulbrook | A01G 9/025 47/62 N |
| 2013/0219788 A1* | 8/2013 | Vanlente | A01G 9/022 47/62 A |
| 2013/0298462 A1* | 11/2013 | Moran | A01G 9/024 47/66.7 |
| 2014/0223816 A1* | 8/2014 | Parker | A01G 9/022 47/82 |
| 2014/0283450 A1* | 9/2014 | Darlington | A01G 31/02 47/62 A |
| 2014/0290137 A1* | 10/2014 | Nagels | A01G 31/06 47/62 R |
| 2015/0223418 A1* | 8/2015 | Collins | A01G 31/02 47/62 R |
| 2015/0296724 A1* | 10/2015 | Martinez Ruanova | A01G 9/025 47/62 R |
| 2015/0313104 A1* | 11/2015 | Cottrell | A01G 22/00 47/62 A |
| 2015/0319946 A1* | 11/2015 | Center | A01G 9/02 47/62 R |
| 2016/0050863 A1* | 2/2016 | Graber | A01G 31/02 47/62 R |
| 2016/0066525 A1* | 3/2016 | Duquesnay | A01G 9/025 47/62 R |
| 2016/0100535 A1* | 4/2016 | Daugirdas | A01G 31/06 47/62 E |
| 2016/0128288 A1* | 5/2016 | Pettinelli | A01G 31/02 47/62 N |
| 2016/0135394 A1* | 5/2016 | Wagner | A01G 31/02 47/62 R |
| 2016/0135395 A1* | 5/2016 | Umpstead | A01G 31/02 47/62 A |
| 2016/0135398 A1* | 5/2016 | Mathieu | A01G 31/06 47/62 R |
| 2016/0192606 A1* | 7/2016 | Karbowski | A01G 31/02 47/62 A |
| 2017/0055473 A1* | 3/2017 | Baker | A01G 31/06 |
| 2017/0105372 A1* | 4/2017 | Bryan, III | A01G 31/06 |
| 2017/0265408 A1* | 9/2017 | McGowan | A01G 22/00 |
| 2018/0035627 A1* | 2/2018 | Williams | A01G 9/023 |
| 2018/0092314 A1* | 4/2018 | McGuinness | A01G 9/023 |
| 2018/0125015 A1* | 5/2018 | Marshall | A01G 9/02 |
| 2018/0295799 A1* | 10/2018 | Wilton | A01G 27/02 |
| 2018/0295800 A1* | 10/2018 | Kiernan | A01G 31/06 |
| 2019/0082606 A1* | 3/2019 | Moffitt | A01G 22/00 |
| 2019/0082617 A1* | 3/2019 | Moffitt | A01G 22/00 |
| 2019/0082627 A1* | 3/2019 | Moffitt | A01G 31/06 |
| 2019/0104697 A1* | 4/2019 | Mendes | A01G 31/02 |

* cited by examiner

VERTICAL HYDROPONIC SYSTEM

CROSS-REFERENCE TO RELATED APPLICATIONS

This application claims priority to provisional application Ser. No. 62/212,984 filed Sep. 1, 2015 entitled "Vertical Hydroponic System", the entire disclosure is hereby incorporated by reference herein.

BACKGROUND OF THE INVENTION

1. Field of the Invention

The present invention is in the technical field of growing systems. More particularly, the present invention relates to a vertical hydroponic system.

2. Description of Related Art

Traditional growing methods require large areas of space with plenty of sun and water. Hydroponic systems and specifically recovery hydroponic systems, where the water is recycled for a predetermined period of time improves efficiency and reduces water consumption. Likewise, vertical hydroponic systems decreases the amount of space required, and allows the grower to access more sun by extending the growing area vertically.

Currently, existing vertical hydroponic systems are expensive to manufacture and difficult to access. Consequently, there is a need for a vertical hydroponic system that is more economical to manufacture and more efficient to use than previously invented models.

BRIEF SUMMARY OF THE INVENTION

In one embodiment of the present invention a vertical hydroponic system comprising a hollow cylindrical growing housing including a first end, a second end, and a peripheral surface having a plurality of apertures, the plurality of apertures having an external opening and an internal opening, the external opening located at a distance offset from the internal opening creating an angled surface extending between the external and internal opening, a spray nozzle located at the first end, a drain apparatus located at the second end, a container containing a liquid, a pump submerged in the liquid, a supply line extending from the pump to the spray nozzle, and a drain line extending from the drain apparatus to the container.

In one embodiment, a supply line is located inside the drain line. In another embodiment, the hollow cylindrical growing housing can be rotated between a vertical and horizontal position. In another embodiment, the drain apparatus is constructed from a heavy material such that: when the hollow cylindrical growing housing is rotated from the vertical to the horizontal position the drain apparatus acts as a counterbalance slowing down the rotation.

In one embodiment, the system further comprises a plurality of cylindrical plant containers having a perimeter surface including a plurality of slits arranged circumferentially, wherein the plurality of plant containers are positioned in the plurality of apertures such that: the plurality of cylindrical plant containers are in an angled position. In one embodiment, the angled position is between 30 and 45 degrees. In another embodiment, the plurality of cylindrical plant containers include at least one notch having a perpendicular surface extending radially from the perimeter surface. In yet another embodiment, the at least one notch is designed to be positioned against the internal opening securing and locking the plant container to the hollow cylindrical housing. In one embodiment, the plurality of plant containers are constructed from a material essential consisting of urethane or rubber. In another embodiment, the plurality of plant containers are constructed from a material essential consisting of hard plastic or high-density polyethylene. In one embodiment, the plurality of plant containers are released from the hollow cylindrical housing when a pressure is applied to the perimeter surface. In another embodiment, the plurality of plant containers are released from the hollow cylindrical housing when the perimeter surface is rotated.

In one embodiment, the system further comprises a drain filter located in the drain apparatus, the drain filter having mesh filter sections designed to prevent roots and growing medium from entering the drain line.

In one embodiment, the system further comprises a fabric sleeve surrounding the peripheral surface, the fabric sleeve having a plurality of holes concentrically aligned to the plurality of apertures, wherein the fabric sleeve is constructed from natural fibers pretreated with bug repellent. In another embodiment, the container comprises a base constructed from a heavy material, and the second end is removably secured to the base.

In one embodiment, the system further comprises a growing strip constructed from a net material filled with a growing medium designed to hold a plurality of seeds, wherein the growing strip is suspended in the hollow cylindrical growing housing from the first end. In another embodiment, the plurality of cylindrical plant containers further comprise a top potion having a rubber flange designed to engage the external opening and the peripheral surface.

In another aspect of the invention a vertical hydroponic system comprising a post, a hollow cylindrical growing housing including a first end, a second end, and a peripheral surface having a plurality of apertures, the plurality of apertures having an external opening and an internal opening, the external opening located at a distance offset from the internal opening creating an angled surface extending between the external and internal opening, a spray nozzle located at the first end, a drain apparatus located at the second end, a container containing a liquid, a pump submerged in the liquid, a supply line extending from the pump to the spray nozzle, a drain line extending from the drain apparatus to the container, wherein the supply line is located inside the drain line, a plurality of cylindrical plant containers having a perimeter surface including a plurality of slits arranged circumferentially, wherein the plurality of plant containers are positioned in the plurality of apertures such that: the plurality of cylindrical plant containers are in an angled position, wherein the hollow cylindrical growing housing is attached to the post by means of a axial pin and a locking pin, the axial pin designed to allow the hollow cylindrical growing housing to rotate between a vertical and horizontal position when the locking pin is disengaged from the post.

In yet another aspect of the invention a method is provided, comprising steps (a) providing liquid in a reservoir; (b) pumping the liquid to a vertical hydroponic growing tube, wherein the vertical hydroponic growing tube comprises a plurality of plants having roots located in a growing medium; (c) releasing the liquid with a sprayer, wherein the released liquid saturates the roots and growing medium; and (d) returning the liquid to the reservoir. In one embodiment, in step (b), the vertical hydroponic growing tube is rotatable between a vertical and horizontal position.

Such stated summary and advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE SEVERAL VIEWS OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character(s) present corresponding part(s) throughout.

DETAILED DESCRIPTION OF THE INVENTION

Figure 1:
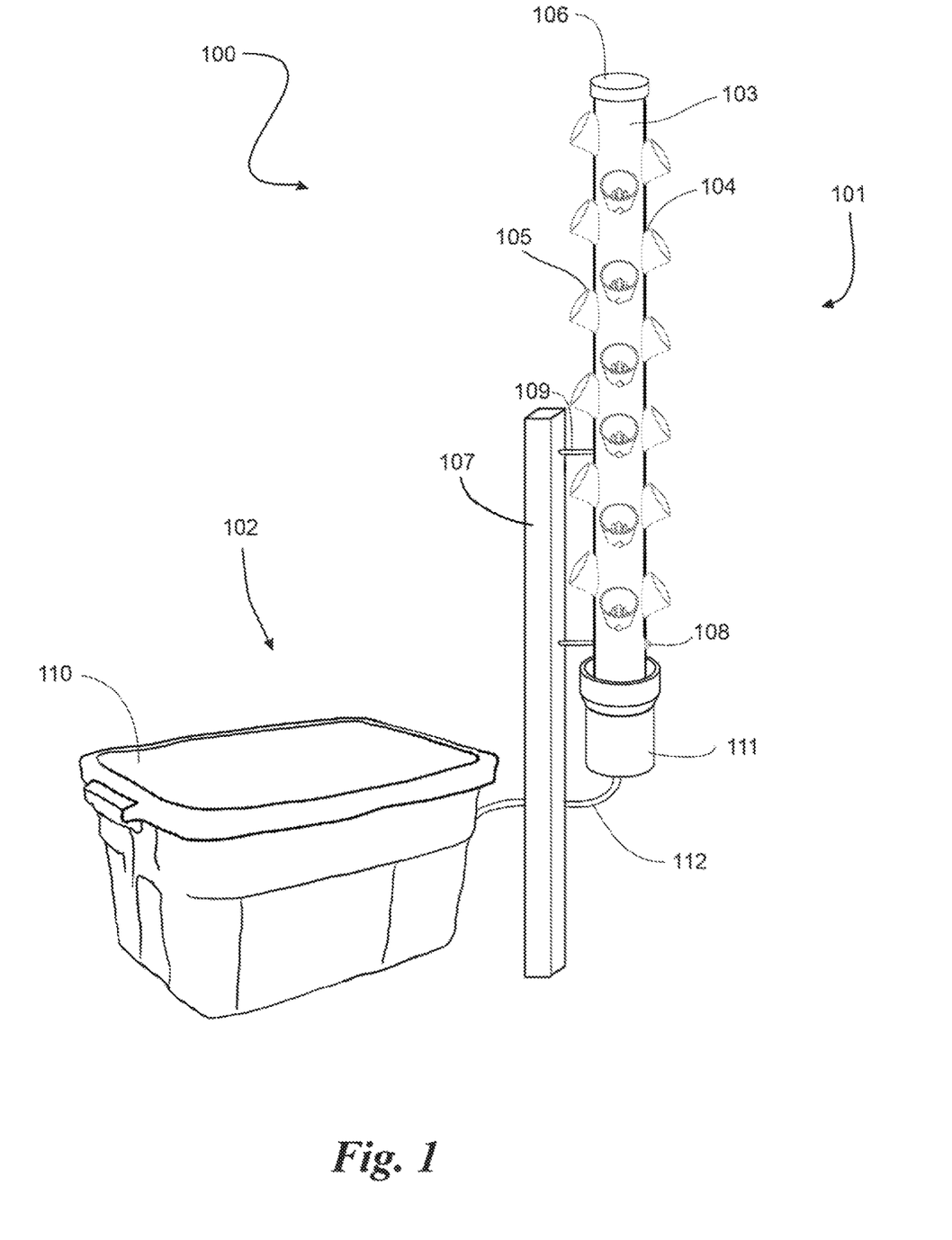
FIG. 1 is an exemplary perspective view illustrating a vertical hydroponic system according to an embodiment of the present invention.

FIG. 1 is an exemplary perspective view illustrating a vertical hydroponic system 100 according to an embodiment of the present invention. The system comprises a vertical hydroponic assembly 101 and an irrigation system 102. The vertical hydroponic assembly comprises a cylindrical shaped housing 103 which includes a plurality of apertures 104 allowing the connection of a plurality of plant containers 105. The cylindrical shaped housing is constructed from a hollow tube made from a high-density polyurethane (HDPE) material and is capped on the top with cap 106. In some embodiments, the cylindrical shaped housing is made from a ceramic material. The housing is supported by post 107, locking pin 108, and axial pin 109. The post is designed to be installed in the ground as well known in the art, and may be further secured by concrete.

An inventive feature of the present invention is the ability for the housing to rotate to a horizontal position using axial pin 109. The locking pin is engaged with the post to prevent unwanted rotation of the housing, and is simply disengaged when rotation is desired. This inventive feature will be discussed in more detail below.

Still referring to FIG. 1, the irrigation system comprises reservoir 110, drain apparatus 111, and irrigation line 112. The reservoir is filled with a watering solution with may be administered to plants located in the plurality of plant containers. In some embodiments, a pump is used to feed the watering solution to the plants through irrigation line 112. The irrigation line is a flexible line that includes a supply line and drain line. The supply line supplies the watering solution to the plants and the drain line returns the watering solution back to the reservoir as known in the art. The details of the irrigation and watering solution will be described in greater detail below. Although the best mode embodiment has been described, the housing may be other shapes in other embodiments, such as a rectangular shaped housing. Likewise, the material, diameter, and length of the housing may be adjusted or changed based on specific growing requirements and environmental conditions. For instance, the cylindrical housing may be constructed of wood, bamboo, and clay.

In some embodiments, two or more cylindrical housings may be included and connected to one reservoir. For instance, one or more pumps may be provided to pump a watering solution to each of the cylindrical housing. The watering solution is then returned to the reservoir, and this process is repeated as necessary. In some embodiments, two cylindrical housings may be positioned on opposite sides of one post. In another embodiment, the cylindrical housings are positioned on separate posts.

Figure 2A:
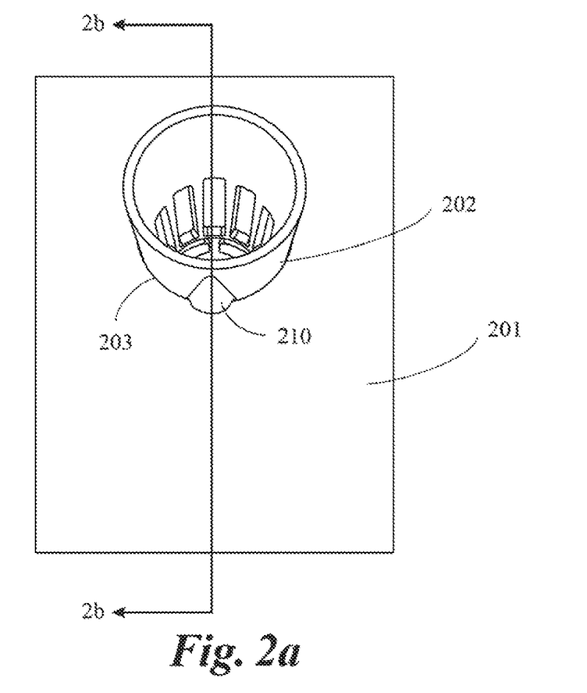
FIGS. 2A-B are exemplary detailed views illustrating components of a vertical hydroponic system according to an embodiment of the present invention.
Figure 2B:
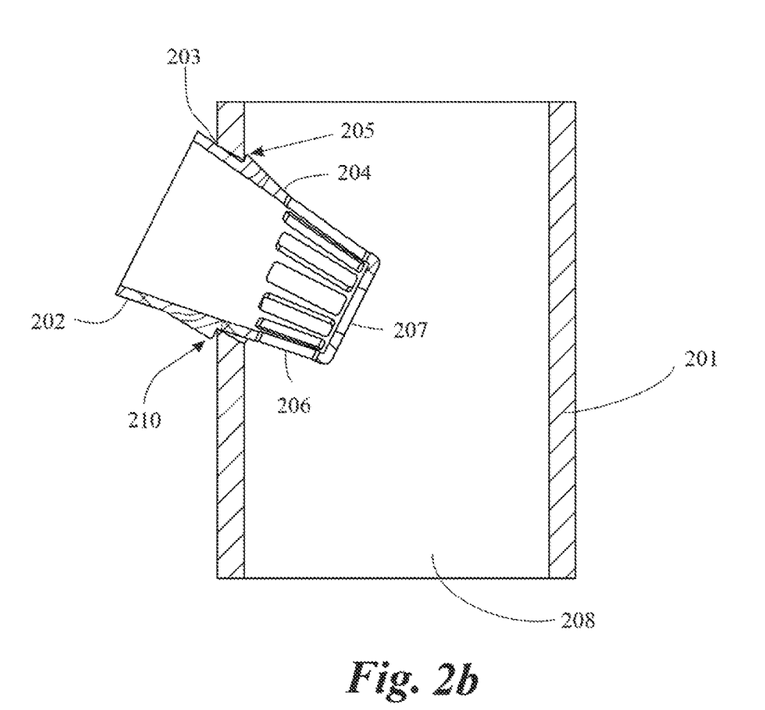
Figure 3A:
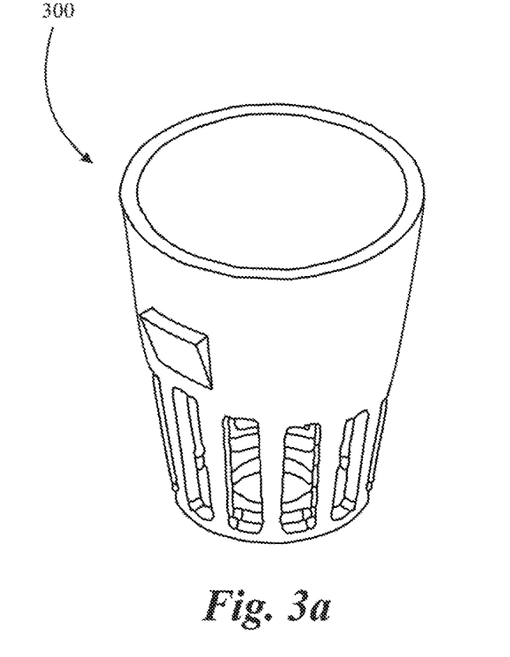
FIGS. 3A-C are exemplary detail views illustrating a plant container of a vertical hydroponic system according to an embodiment of the present invention.
Figure 3B:
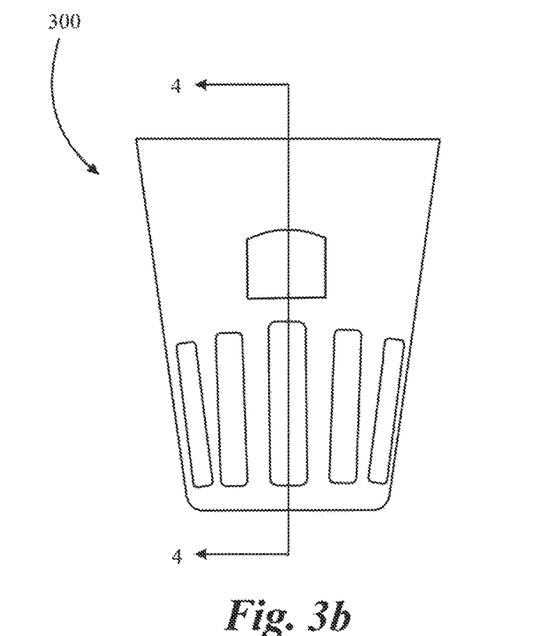
Figures 3C, 4:
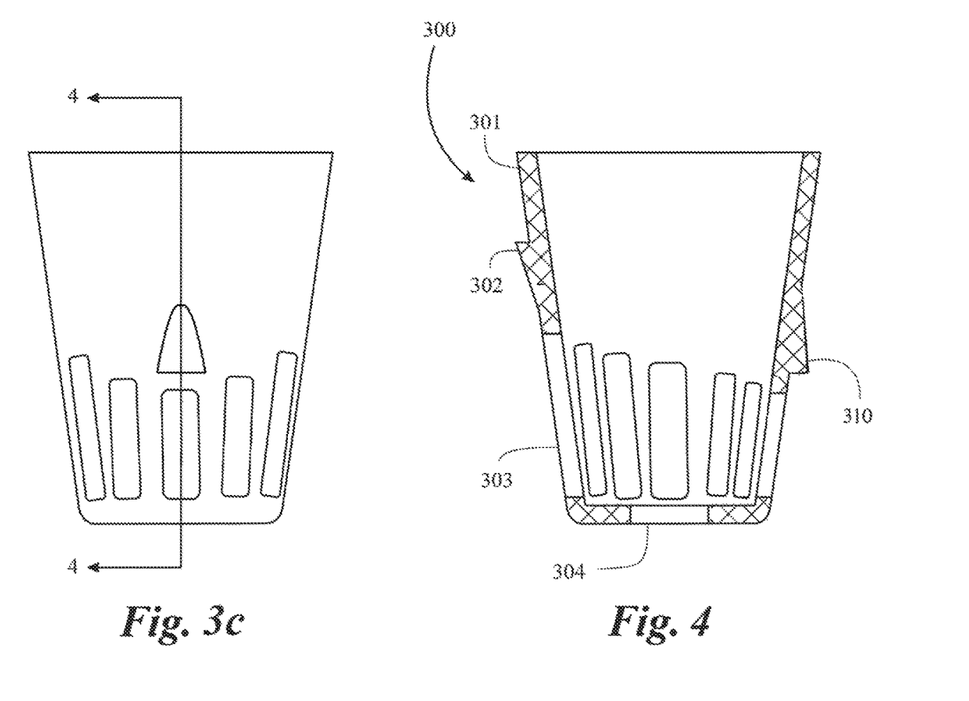
FIG. 4 is an exemplary section view illustrating the plant container of FIGS. 3A-C.

FIGS. 2A-B are exemplary detailed views illustrating components of a vertical hydroponic system according to an embodiment of the present invention. FIG. 2A illustrates housing 201 with aperture 203 allowing for the connection of plant container 202. FIG. 2B is a section taken along section line 2b-2b. Now referring to FIG. 2B, plant container 202 is positioned in aperture 203 of housing 201. The aperture's perimeter is angled giving the aperture an oval shaped profile allowing the plant container to sit at an angle when positioned in the housing. The specific angle may vary, but preferably the angle is between 30 and 45 degrees. The varying angles affect the efficiency of the watering procedure and also the wear and lifespan of the plant containers. The aperture represents the plurality of apertures illustrated in FIG. 1. The plant containers are constructed of a generally cylindrical shape having a notch 205 located on perimeter surface 204 of the plant container. The notch comprises a perpendicular surface designed to be positioned against the inside edge of the aperture. The notch allows the secured connection between the plant container and housing. The notch further provides a quick-connect and disconnect method for installing and removing the plurality of plant containers from the housing. During use, the plant container is passed through the aperture in a perpendicular position relative to the surface of the housing. Once the notch is passed though the aperture the plant container is angled until the notch catches the inside edge of the aperture. For removal, the plant container can be rotated then pulled back through the aperture, or pressure can be applied to the container freeing the notch from the inside edge of the housing allowing removal. The method for removal is dependent on the material used. The plant container may be constructed from a variety of materials, including but not limited to, rubber, urethane, plastic, and ceramic. If a harder material is used, such as plastic, the rotation method for removal is preferred. Likewise, if a softer material is used, such as rubber, the pressure method for removal is preferred. For instance, if a rubber like elastomer such as urethane is used, when pressure is applied to the plant container it retains its elasticity and returns to its original dimensions. Although, one notch is illustrated in some embodiments, more than one notch may be included. In one embodiment, a stop 210 is included on the perimeter surface of the plant container. The stop prevents the plant container from entering the hollow section, avoiding plant damage and loss of materials. The stop also helps support the weight of planting medium and planting material during use.

Still referring to FIGS. 2A-2B, the plant container further comprises netting 206 and an opening 207. Netting 206 is positioned on the bottom portion of the plant container designed such that when the plant container is affixed in the housing, the netting is positioned in the hollow section 208 of the housing. The netting is constructed of various rectangular openings which allow for air and water to access plant roots during use. Further, the netting and opening allow for the plant roots to expand out of the plant container while growing.

FIGS. 3A-C and FIG. 4 are exemplary detail views illustrating a plant container 300 of a vertical hydroponic system according to an embodiment of the present invention. As described above the plant container is generally constructed of a cylindrical shape. Now referring to FIG. 4, a section view taken along section line 4-4c of FIGS. 3B-C, the plant container's profile can shape is clearly illustrated. Plant container 300 comprises perimeter surface 301 including notch 302 and stop 310. The plant container further comprises netting 303 and an opening 304. The netting is constructed of various rectangular openings which allow for air and water to access plant roots during use. Further, the netting and opening allow for the plant roots to expand out of the plant container while growing. In some embodiments, the plant container is made from a ceramic material.

Figure 5:
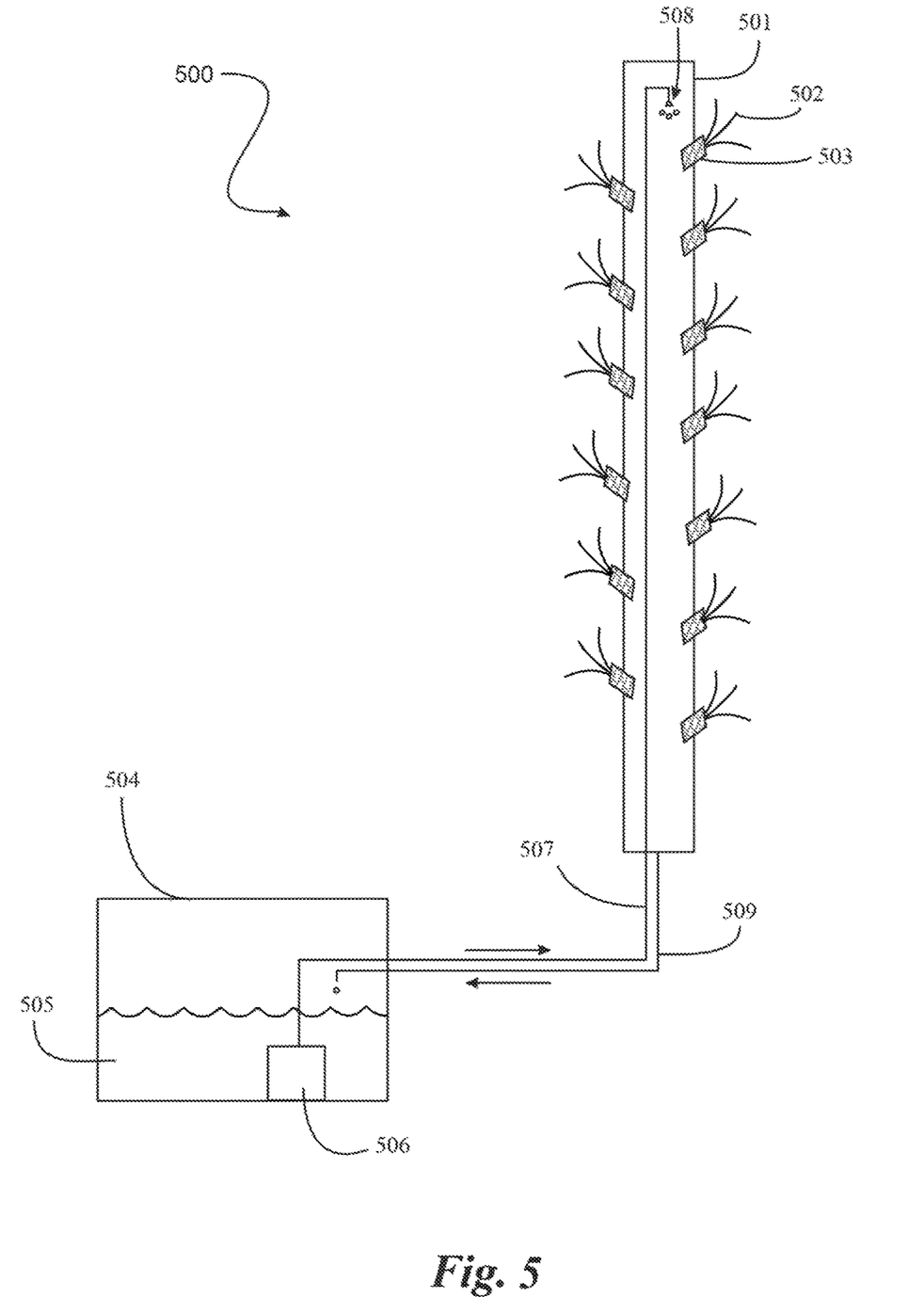
FIG. 5 is an exemplary diagram illustrating the operation of a vertical hydroponic system according to an embodiment of the present invention.

FIG. 5 is an exemplary diagram illustrating the operation of a vertical hydroponic system 500 according to an embodiment of the present invention. In this embodiment, a simplified diagram representing the system of FIG. 1 is illustrated. The system comprises housing 502 designed for growing a plurality of plants 502 in a vertical position using inventive planting containers 503 positioned in angled apertures, located at various positions spaced along the housing. A watering solution 505 is provided in a reservoir 504. The watering solution may be any solution, including but not limited to mineral nutrients, aerated water, and compost tea. Preferably, the watering solution is agitated or aerated using a combination of air pumps and air stones as well known in the art. The watering solution is replaced in a predetermined amount of time or if a change in specific nutrients is required depending on the plant's needs. The watering solution is supplied to the plurality of plants by supply line 507 by means of pump 506. A drain line 509 drains the watering solution into the container. In some embodiments, the pump has an attached filter, filtering the watering solution before it is supplied to the plants. A spray nozzle 508 is provided located at the top of the housing for dispersing the watering solution to the plurality of plants and specifically the plant medium and roots. In some embodiments, multiple spray nozzles are provided at various heights along the housing improving the delivery of watering solution to the plurality of plants. Preferably, the plant medium is a soilless medium, including but not limited to coconut choir, lightweight expanded clay aggregate (LECA), rock wool, perlite, or any combination of the disclosed mediums.

In some embodiments, the spray nozzle delivers a fine mist to the plurality of plants. Yet in another embodiment, the spray nozzle delivers small droplets to the plurality of plants. In some embodiments, a timer is provided to control the watering schedule. The timer is adjusted to provide a predetermined amount of watering solution to the plurality of plants at specific time intervals as well known in the art.

In some embodiments, a soil mixture may be placed at the top of the housing such that when the spray nozzle delivers water to the plurality of plants, the water is dripped through the soil providing nutrients to the plants.

Figure 6:
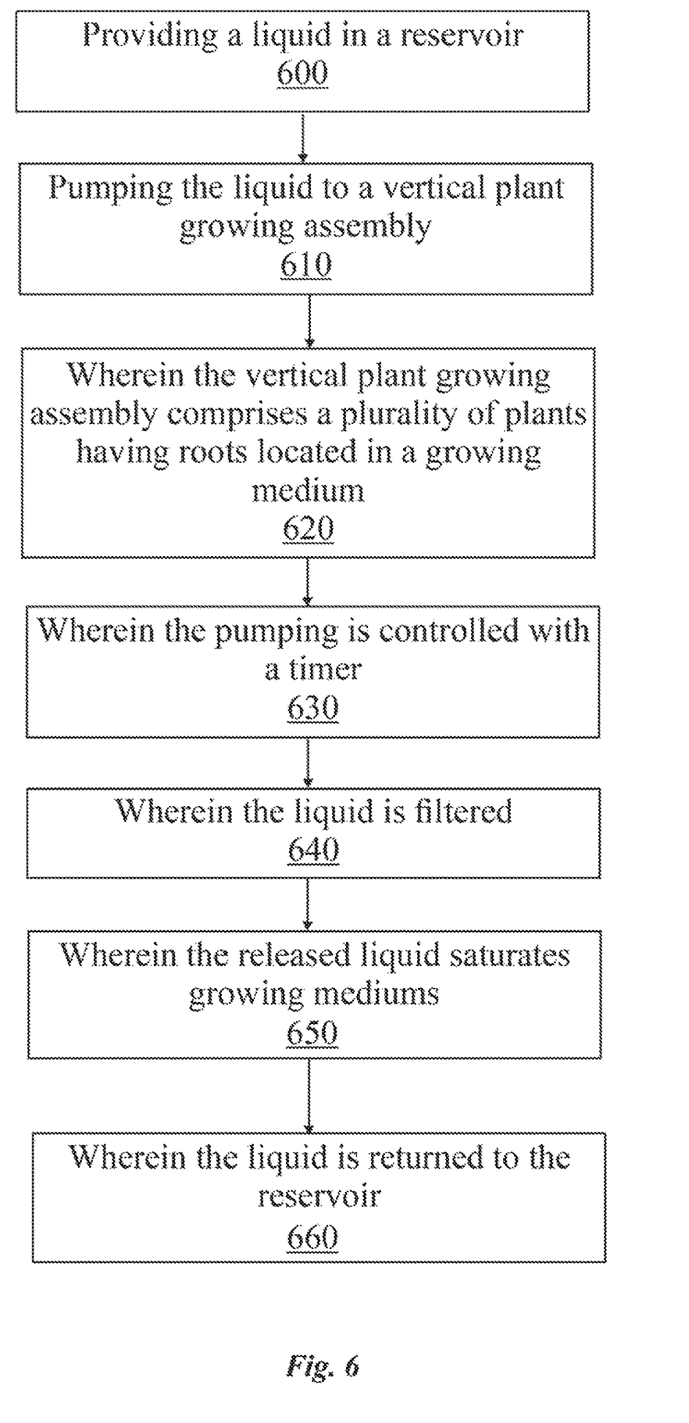
FIG. 6 is an exemplary flow diagram illustrating a method for operating a vertical hydroponic system according to an embodiment of the present invention.

FIG. 6 is an exemplary flow diagram illustrating a method for operating a vertical hydroponic system according to an embodiment of the present invention. In step 600, a liquid is provided in a reservoir. The liquid may be any liquid designed for plant intake including, but not limited to mineral nutrients, aerated water, and compost tea. In step 610, the liquid is pumped to a vertical plant growing assembly. In step 620, the vertical plant growing assembly comprises a plurality of plants having roots located in a growing medium. Preferably, the plant medium is a soilless medium, including but not limited to coconut choir, lightweight expanded clay aggregate (LECA), rock wool, perlite, or any combination of the disclosed mediums. In step 630, the pumping is controlled with a timer. The timer is adjusted to provide a predetermined amount of liquid to the plurality of plants at specific time intervals as well known in the art. In step 640, the liquid is filtered, by means of an attached filter, filtering the liquid before it is supplied to the plurality plants. In step 650, the released liquid saturates the growing mediums, and specifically the plant's roots located in and outside the growing medium. Finally, in step 660, the liquid is returned to the reservoir.

Figure 7A:
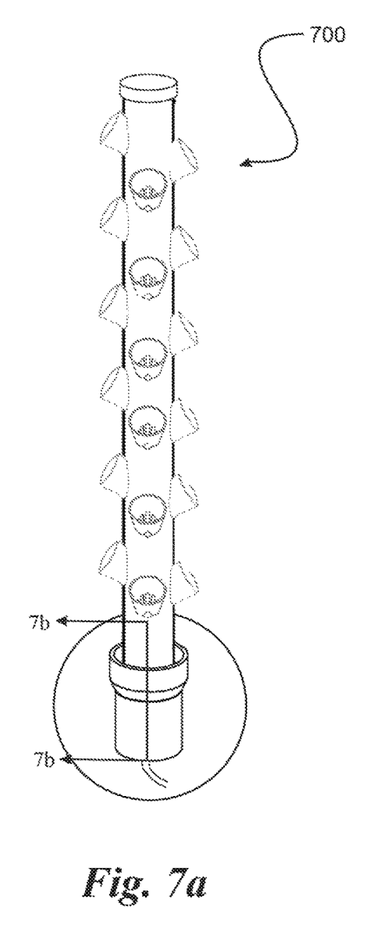
FIGS. 7A-B are exemplary detail views illustrating components of a vertical hydroponic system according to an embodiment of the present invention.
Figure 7B:
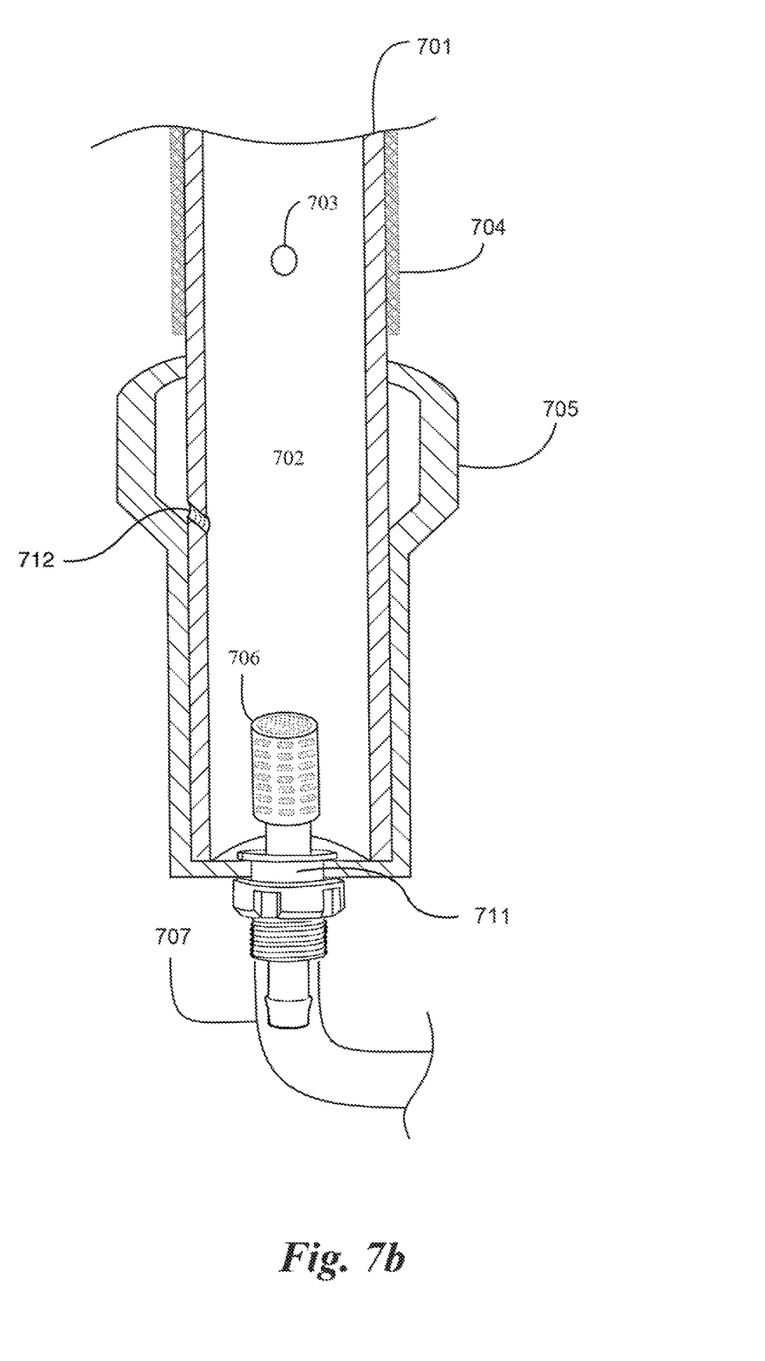

FIGS. 7A-B are exemplary detail views illustrating components of a vertical 700 hydroponic system according to an embodiment of the present invention. FIG. 7A specifically illustrates the cylindrical housing and part of the drain apparatus. FIG. 7B is a sectional view taken along section lines 7b-7b of FIG. 7A. Now referring to FIG. 7B, cylindrical housing 701 is illustrated inside drain apparatus 705. The cylindrical housing has a hollow interior 702 and aperture 703 design for a locking pin as discussed previously. In some embodiments, a fabric sleeve 704 is provided. The fabric sleeve may extend the entire length of the housing or only cover sections of the housing. The fabric sleeve may be used to repel insects or keep the roots cool though evaporating cooling during hot weather when saturated.

Likewise, the fabric sleeve may be simply added for ornamental purposes. The fabric may be constructed from natural fibers or pretreated with bug repellent consisting of linen, cloth, or hemp.

The drain apparatus has a funnel shape located on the top portion designed to catch any additional runoff water from the plants. The drain apparatus is preferably constructed from a heavy material, including but not limited to rubber, hard plastic, clay, and cement. The heavy material used helps counterbalance the housing during rotation, with will be discussed in greater detail below. In one embodiment, the cylindrical housing comprises a drain hole allowing the captured runoff water to enter the interior of the housing.

A drain filter 706 is provided at the bottom of the drain apparatus. The drain filter comprises mesh filter sections designed to prevent roots and other large pieces, such as growing medium materials from entering drain line 707. The drain line returns to the reservoir (FIG. 1) via aperture 711. The drain filter may be constructed of any shape, included but not limited to cylindrical, rectangular, and spherical. The drain filter may include any number of mesh filter sections on the top, bottom, and sides of the filter. Although the drain filter is illustrated at a distance from the bottom surface of the drain apparatus, in some embodiments, the drain filter is flush with the bottom surface of the drain apparatus to prevent a buildup or collection of liquid or watering solution.

Figures 8A, 8B:
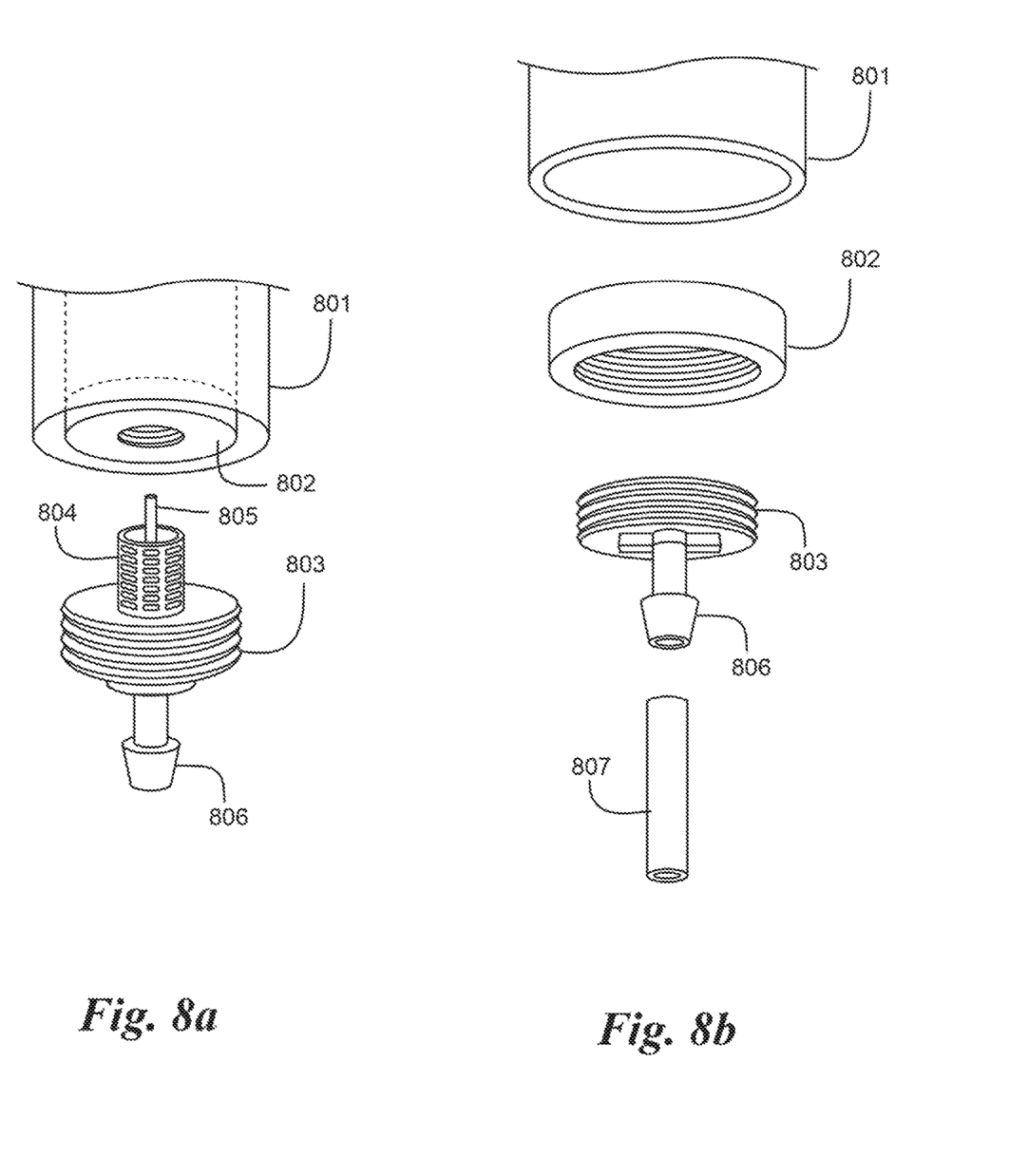
FIGS. 8A-B are exemplary exploded views illustrating drain components of a vertical hydroponic system according to an embodiment of the present invention.
Figure 9A:
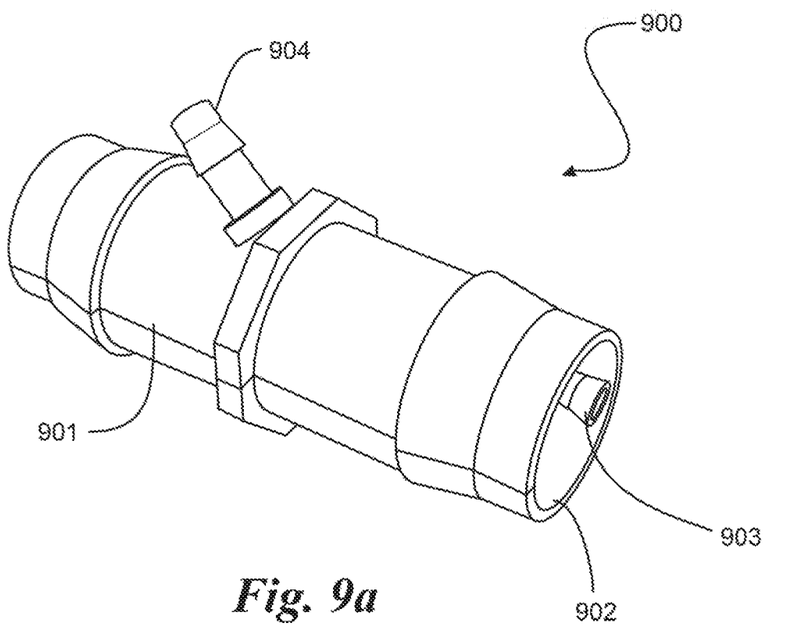
FIGS. 9A-B are exemplary detail views illustrating irrigation and drain components of a vertical hydroponic system according to an embodiment of the present invention.
Figure 9B:
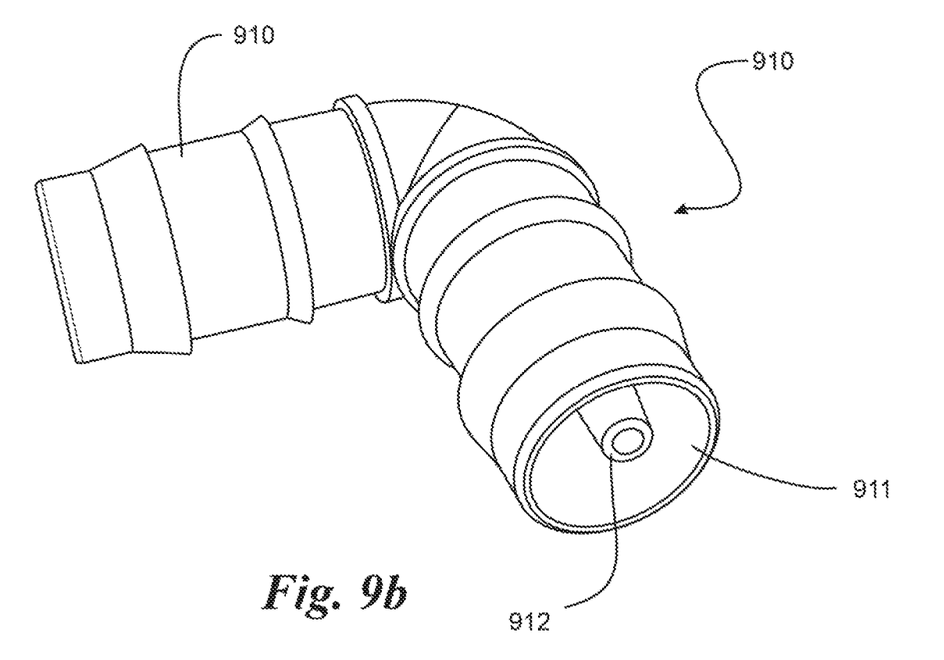

FIGS. 8A-B are exemplary exploded views illustrating drain components of a vertical hydroponic system according to an embodiment of the present invention. A grommet 802 comprising a set of internal threads is positioned at the bottom portion of housing/drain apparatus 801. The grommet is preferably made of rubber. A plug 803 comprising external threads in threaded into the internal threads of the grommet sealing the bottom potion of the housing/drain apparatus. Plug has an aperture in the center allowing the connection of drain connector 806 and irrigation/supply line 805 through optional drain filter 804. The drain connector allows the connection to drain line 807. FIGS. 9A-B are exemplary detail views illustrating irrigation and drain components of a vertical hydroponic system according to an embodiment of the present invention. Referring now to FIG. 9A, a straight irrigation component 900 is illustrated. The straight irrigation component comprises straight body 901 having a hollow interior 902. The straight irrigation component includes supply line 903 located inside the hollow interior. The hollow interior is used as a drain line for water runoff after watering as discussed previously. The supply line is used to supply plants with water during use. In some embodiments, an optional supply line 904 is provided. The optional supply line may be used to supply additional plants located in a different housing member.

Now referring to FIG. 9B, a curved irrigation component 910 is illustrated. The curved irrigation component comprises curved body 910 having a hollow interior 311 including supply line 912. The curved body may be constructed at any angle necessary for efficient draining and supply. The irrigation components illustrated may be used to connect to other irrigation lines or extended in length as needed. The inventive feature of including the supply line inside the drain line and irrigation components allows for a more efficient hydroponic growing system, reducing the amount of visible lines, which reduces the opportunities for leaks and failures.

Figure 10:
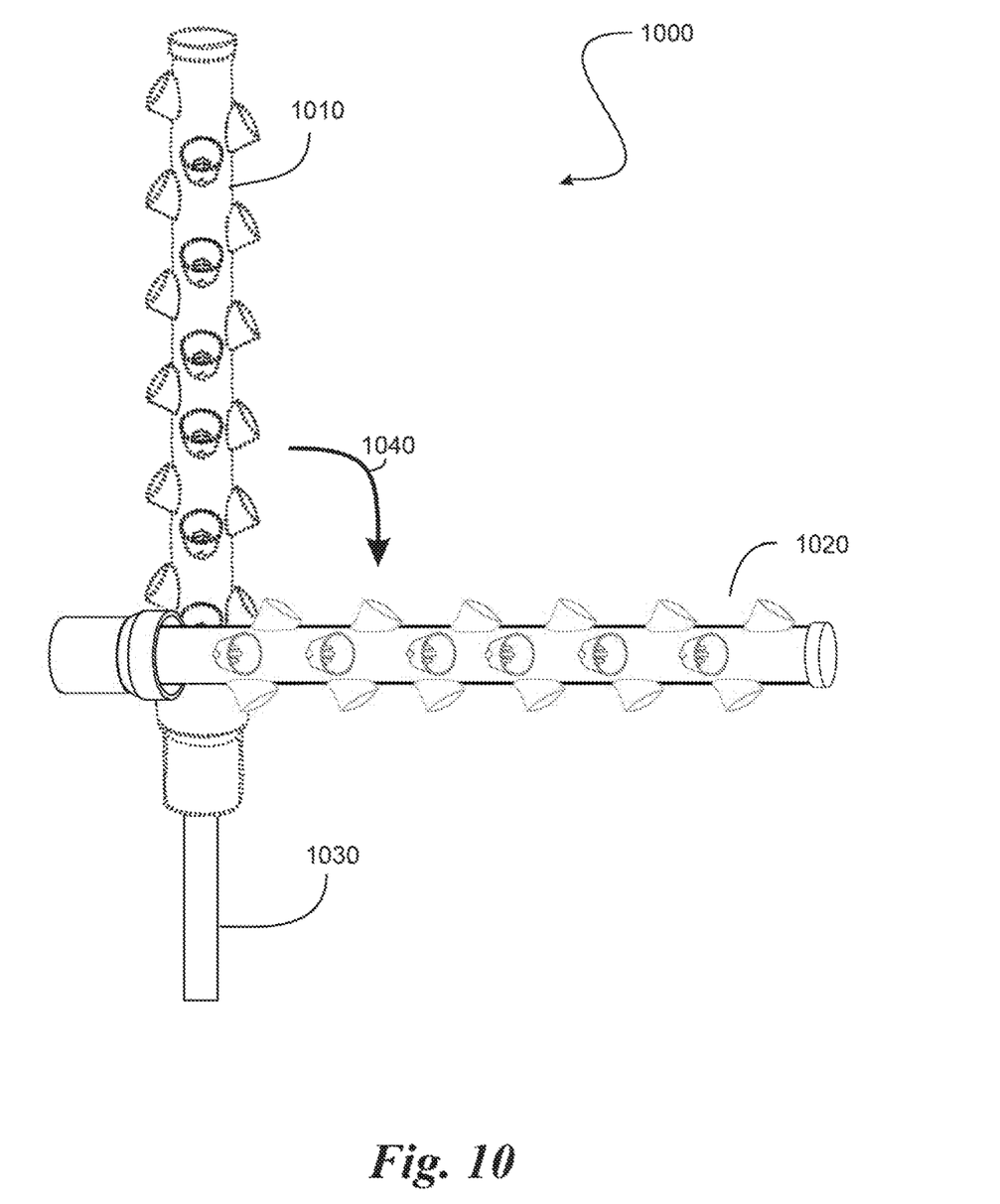
FIG. 10 is an exemplary detailed view illustrating the operation of a rotational feature of a vertical hydroponic system according to an embodiment of the present invention.

FIG. 10 is an exemplary detailed view illustrating the operation of a rotational feature 1000 of a vertical hydroponic system according to an embodiment of the present invention. The rotational features allows for the rotation of housing from a vertical position 1010 to a horizontal position 1020. Specifically, the housing is rotated 90 degrees 1040 using axial pin (FIG. 1) located on post 1030. As mentioned previously, the weight of the drain apparatus acts as a counterbalance to allow the rotation in a smooth and controlled manner preventing damage to the plurality of plants during rotation. An additional lock (not pictured) may be provided to prevent the unwanted rotation once the housing is in the horizontal position.

It is a particularly inventive feature of the present invention to allow the housing to rotate to the horizontal position. When the housing is in the horizontal position, it provides an easier and more efficient planting height and harvesting height. Likewise, it allows an easier placement of the housing for installing and removing the plant containers. After completion of any task that requires the housing in the horizontal position, the housing is simply rotated to the vertical position. The rotation also provides the ability to perform routine maintains and repairs without requiring complete dissembling or a ladder to access components located on or near the top of the system. For instance to access the spray nozzle (FIG. 5), a user may simply rotate the housing to the horizontal position and remove the cap (FIG. 1). Without this inventive feature, the user would be required to use a ladder to access the cap or possibly it would require the removal of the housing from the post. Additionally, if the housing is at a certain height a ladder may not be safe or practical for accessing components located near the top of the system.

Figure 11:
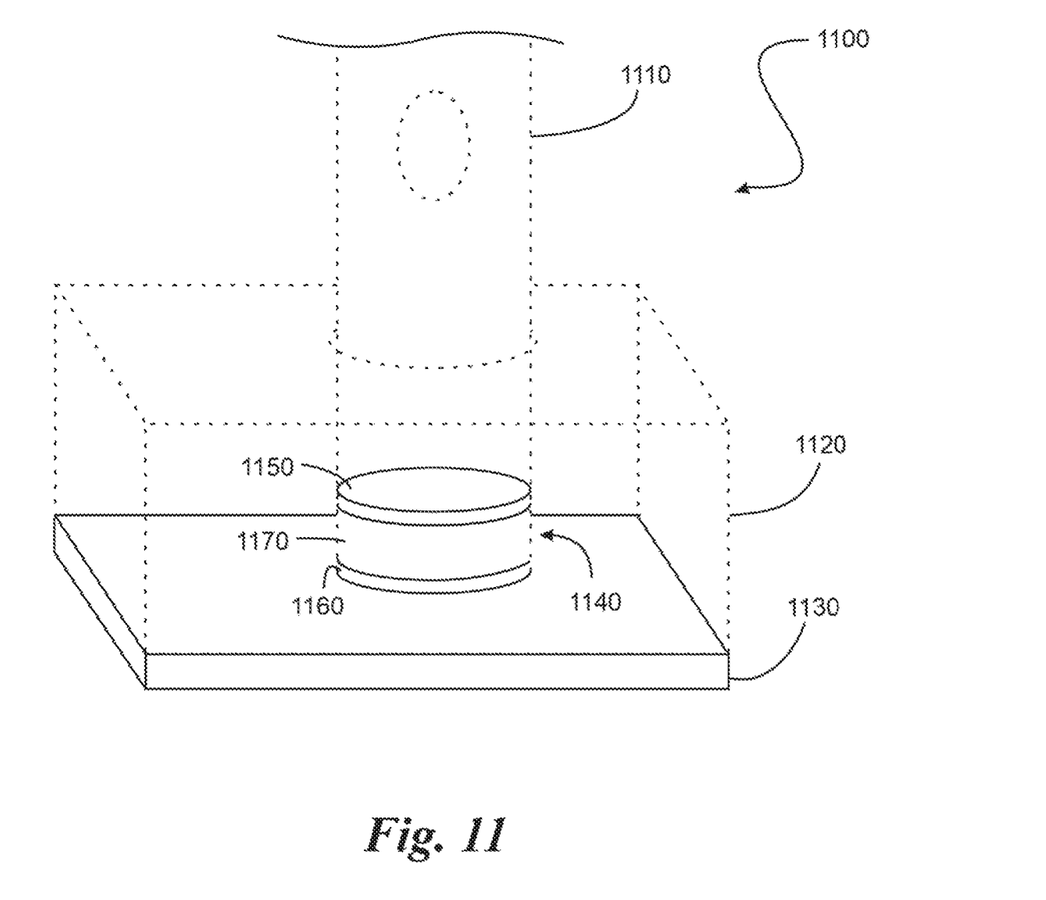
FIG. 11 is an exemplary detail view illustrating an alternative reservoir of a vertical hydroponic system according to an embodiment of the present invention.

FIG. 11 is an exemplary detail view illustrating an alternative reservoir 1100 of a vertical hydroponic system according to an embodiment of the present invention. The alternative reservoir comprises reservoir housing 1120 and reservoir base 1130. The reservoir base is constructed from a heavy material, including but not limited to cement and clay. This alternative reservoir configuration provides more support to the system and eliminates the need for additional drain and irrigation lines. Specifically, cylindrical housing 1110 is attached to reservoir with attachment means 1140, essentially consisting of a peg having a top portion 1150 and bottom portion 1160 with a grommet 1170 located between the top and bottom portions of the peg. The grommet is preferably made of rubber. This inventive feature, takes advantage of the weight of the water that is present in the reservoir to support the weight and height of the cylindrical housing. In some embodiments, the cylindrical housing can be threaded into the reservoir base. This is useful in some embodiments, where the present invention is freestanding, such as when the post (FIG. 1) is not included.

Figure 12A:
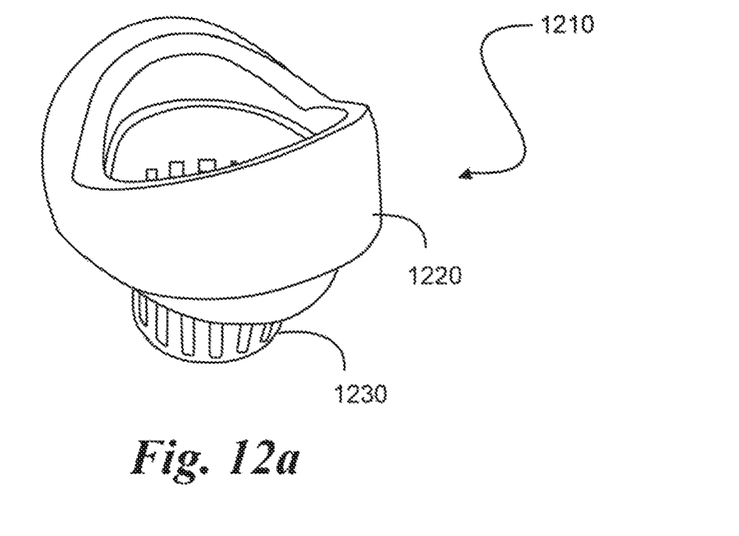
FIGS. 12A-B are exemplary detail views illustrating a net pot of a vertical hydroponic system according to an embodiment of the present invention.
Figure 12B:
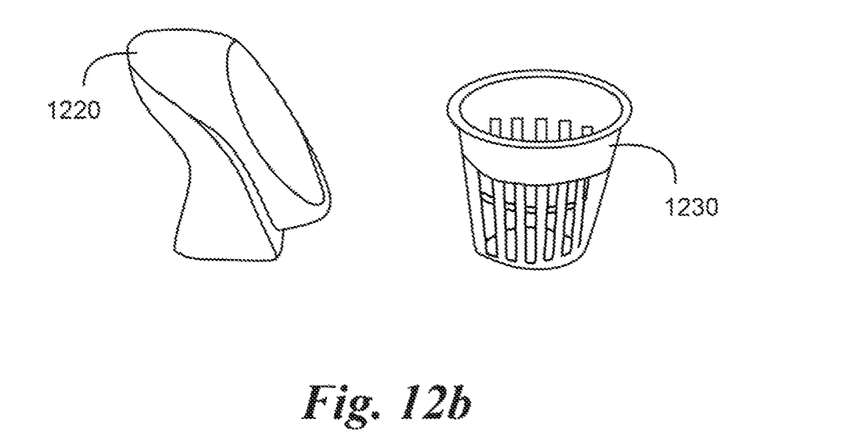

FIGS. 12A-B are exemplary detail views illustrating a net pot 1210 of a vertical hydroponic system according to an embodiment of the present invention. FIG. 12A illustrates the net pot in an assembled position comprising top portion 1220 and bottom portion 1230. FIG. 12B illustrates the net pot in a dissembled position. The bottom portion is a pot having a plurality of slits to allow air and water to access plant roots. The top portion is designed to fit on bottom portion allows the net pot to sit at an angle when the net pot is installed in the cylindrical housing (FIG. 1). Specifically, the top portion has a cylindrical portion for adapting and connecting to the bottom portion with an oversized angled flange for resting on the outer surface of the cylindrical housing (FIG. 1). The top portion is preferably made of a material consisting of rubber. In some embodiments, the bottom portion is made from a ceramic material.

This alternative net pot design replaces the need for the notch described in some planting container embodiments.

The configuration allows the use of manufactured pots, illustrated and described as the bottom portion, lowering manufacturing cost and increasing the availability planting containers for consumer sales.

Figure 13A:
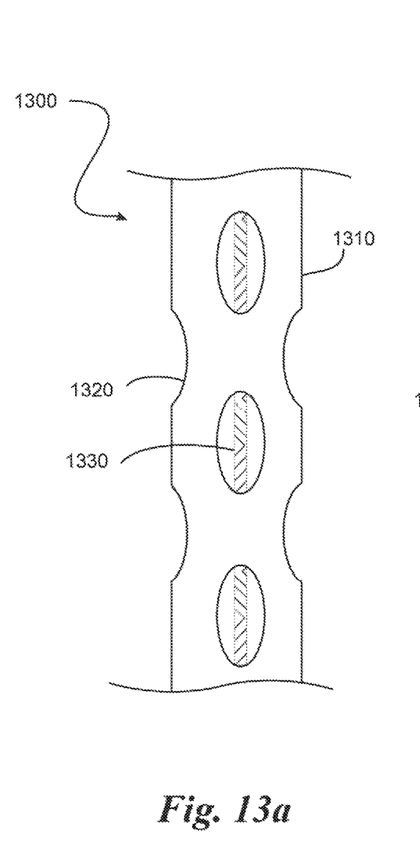
FIGS. 13A-C are exemplary detailed views illustrating the operation of components of a potless vertical hydroponic system according to an embodiment of the present invention.
Figures 13B, 13C:
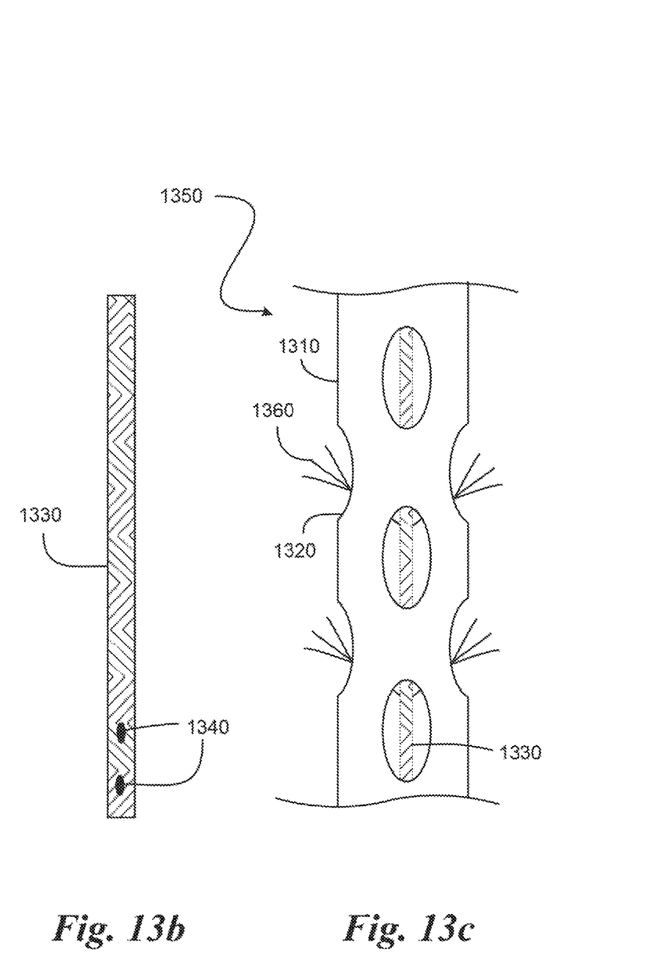

FIGS. 13A-C are exemplary detailed views illustrating the operation of components of a potless vertical hydroponic system according to an embodiment of the present invention. FIG. 13A illustrates a potless vertical hydroponic system 1300 comprising cylindrical housing 1310 having a plurality of openings 1320 with a growing strip 1330 that is suspending in the housing. The plurality of openings have an angled or oval shape and are spaced at varies locations around the housing. The growing strip is constructed of a net or mesh like material that is filled with a growing medium, preferably growing medium design for starting seeds.

Now referring to FIG. 13B, seeds 1340 are placed in the growing strip 1330, and specifically in the growing medium at various lengths and quantities along the growing strip. In this embodiment, specific plant variety seeds are preferable to others, including but not limited to tubers and herbs.

FIG. 13C illustrates the potless vertical hydroponic system during the growing cycle 1350 comprising a plurality of plants 1360 growing out of the plurality of openings from the growing strip suspended in the housing. During the growth cycle, the plurality of plants naturally grow towards the light entering the plurality of opening, allowing the plants to grow through the openings and outside the housing, similarly to the previous embodiments without the use of a net pot or plant containers. The roots of the plurality of plants grow inside the housing. The system and specifically the growing medium and roots are watered similarly as previously discussed and described.

The potless vertical hydroponic system has many advantages, including a quicker seeding process as it would be less time consuming to places seeds in the growing strip prior to placement inside the housing compared to preparing individual plant containers. Likewise, the harvesting process is more efficient and less time consuming compared to harvesting and removing each individual plant container.

Figure 14:
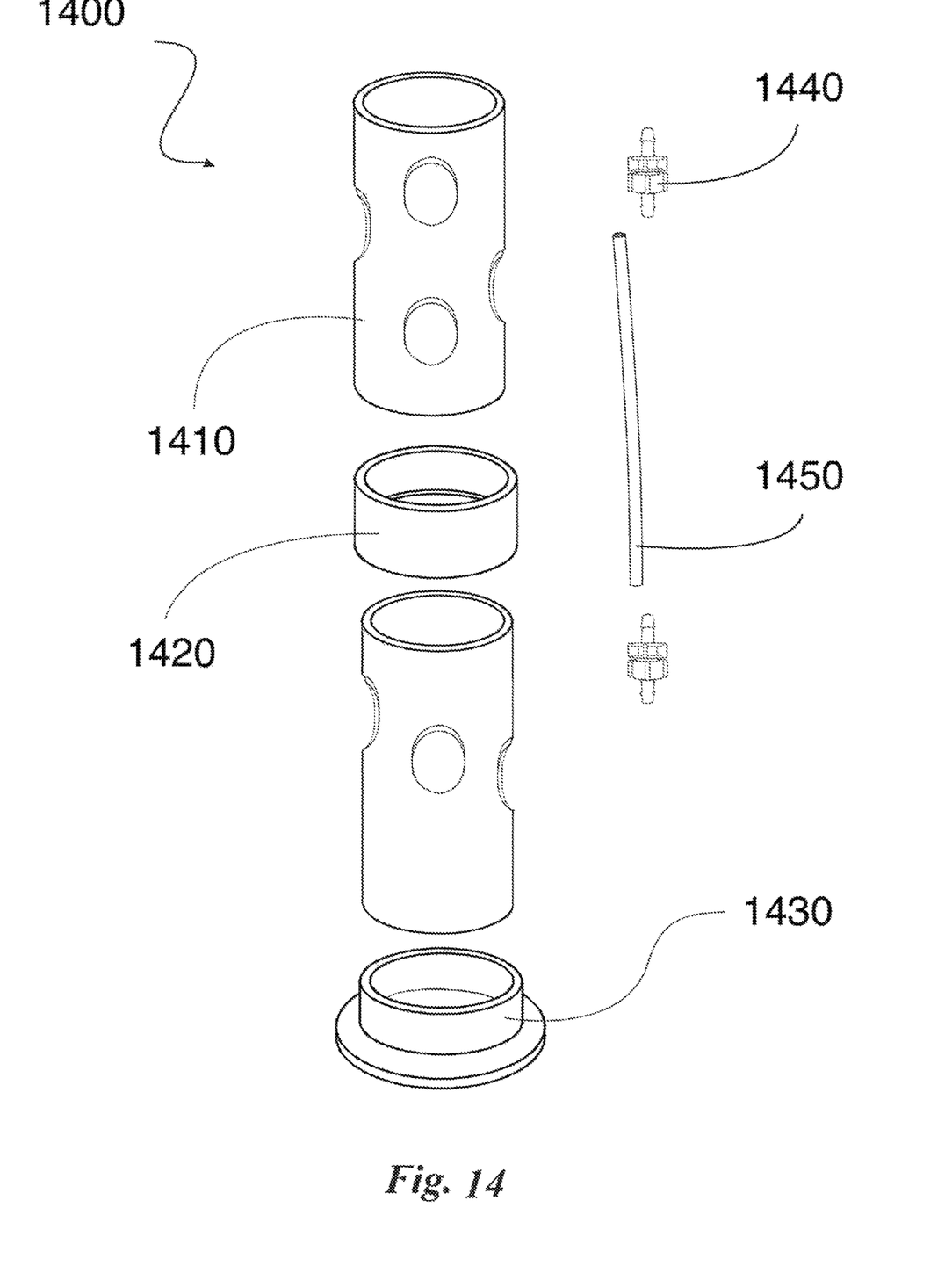
FIG. 14 is an exemplary exploded view illustrating assembly mounting components of a vertical hydroponic system according to an embodiment of the present invention.

FIG. 14 is an exemplary exploded view illustrating assembly mounting components 1400 of a vertical hydroponic system according to an embodiment of the present invention. In one embodiment, one section of cylindrical shaped housing 1410 may be coupled to another section of cylindrical shaped housing via coupling 1420. The assembly mounting components further comprise mounting sleeve 1430 allowing the connection of the cylindrical shaped housing to the bottom of a reservoir (FIG. 11). Further, quick-connection element 1440 allows for the quick connection and release of sections of supply line 1450 during assembly of the vertical hydroponic system. As previously mentioned, the supply line supplies water to the top of the cylindrical shaped housing during operation.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, although a hydroponic system is provided, the system may be adapted for use with an aeroponic system and methods. Likewise, the system may be used with a traditional soil medium. Furthermore, the location of the system can be adapted. For instance, the housing can be attached to the side of a building in lieu of a post in the ground. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:

1. A pivotally attached plant cultivating apparatus comprising:
    a container containing a liquid;
    a pump in fluid communication with said liquid;
    a hollow growing housing;
    a plurality of plant containers which are detachable from said hollow growing housing;
    a support adjacent to said hollow growing housing;
    wherein said hollow growing housing is pivotally attached to said support whereby said growing housing is capable of rotating from a vertical position to a horizontal position.

2. The system of claim 1, wherein the growing housing is pivotally attached to said support by means of an axial pin.

3. The system of claim 2, wherein the growing housing is secured in said vertical position with a locking pin in contact with said support and the growing housing to secure said growing housing in said vertical position.

4. A plant cultivating apparatus comprising:
    a container containing a liquid;
    a pump in fluid communication with said liquid;
    a vertical hollow growing housing with a first end, a second end, an inner plane, and an outer plane,
    a supply line extending from said pump to said first end of said growing housing, said second end of the said hollow growing housing having the ability to drain into said container;
    wherein said hollow growing housing includes at least one aperture extending from said outer plane to said inner plane at an obtuse angle to the longitudinal axis of said hollow growing housing for securely holding a tapered cylindrical plant container, said aperture having an inner edge and an outer edge;
    said tapered cylindrical plant container comprising a first notch protruding from a side of said tapered cylindrical plant container wherein said first notch comprises a perpendicular surface extending radially from said side of said tapered cylindrical plant container, wherein said perpendicular surface of said first notch is positioned against said inner edge of said aperture, and a second notch on the opposite side of said tapered cylindrical plant container having a perpendicular surface extending radially from said opposite side of said tapered cylindrical plant container, wherein said perpendicular surface of said second notch is positioned against said outer edge of said aperture thus securing said tapered cylindrical plant container at an obtuse angle to the longitudinal axis of said hollow growing housing.

\* \* \* \* \*